United States Patent
Griffin

(10) Patent No.: US 8,596,489 B2
(45) Date of Patent: Dec. 3, 2013

(54) LIQUID STORAGE SYSTEM

(76) Inventor: Martin W. Griffin, Taylor Mill, KY (US)

( * ) Notice: Subject to any disclaimer, the term of this patent is extended or adjusted under 35 U.S.C. 154(b) by 311 days.

(21) Appl. No.: 13/009,310

(22) Filed: Jan. 19, 2011

(65) Prior Publication Data

US 2011/0174825 A1  Jul. 21, 2011

Related U.S. Application Data

(60) Provisional application No. 61/296,713, filed on Jan. 20, 2010.

(51) Int. Cl.
*B65D 88/54* (2006.01)
*B65D 88/74* (2006.01)
*B65D 88/00* (2006.01)

(52) U.S. Cl.
USPC .................................. 220/565; 220/DIG. 13

(58) Field of Classification Search
USPC .................... 211/85.4; 392/456, 459; 4/242.1, 4/DIG. 11
See application file for complete search history.

(56) References Cited

U.S. PATENT DOCUMENTS

| | | | | | |
|---|---|---|---|---|---|
| 133,123 | A | * | 11/1872 | Shea | 222/109 |
| 2,746,609 | A | * | 5/1956 | Welsh | 108/149 |
| 2,789,201 | A | * | 4/1957 | Frank | 219/523 |
| 4,028,747 | A | * | 6/1977 | Newton | 4/317 |
| 4,603,443 | A | * | 8/1986 | Stewart | 4/314 |
| 5,249,511 | A | | 10/1993 | Shumate et al. | |
| 6,157,776 | A | * | 12/2000 | Onken | 392/441 |
| 6,367,096 | B1 | * | 4/2002 | Quintana | 4/427 |
| 6,934,977 | B1 | * | 8/2005 | Quintana et al. | 4/427 |
| 2007/0000044 | A1 | * | 1/2007 | Huei | 4/661 |
| 2007/0277301 | A1 | * | 12/2007 | Quintana | 4/353 |
| 2008/0163414 | A1 | * | 7/2008 | Andronyk | 4/415 |
| 2011/0186592 | A1 | | 8/2011 | Palazzo et al. | |

OTHER PUBLICATIONS

The Stool Pigeon: I Can See Clearly Now, archived Sep. 19, 2009, http://web.archive.org/web/20090919150607/http://thestoolpigeonblog.blogspot.com/2009/07/i-can-see-clearly-now.html.*
Kohler_K-3564_Saile elongated one-piece toilet with dual flush technology, archived May 1, 2008, http://web.archive.org/web/20080501115936/http://www.us.kohler.com/onlinecatalog/detail.jsp?from=thumb&frm=&module=Toilets&item=13150202[]_num=3564&section=2&category=13.*
Frontline International, Inc., Brochures of Products, (c) 2006.
Frontline International, Inc., Specifications for 24", 30", and 42" Waste Cooking Oil Tank System Layout, (c) 2006.
Frontline International, Inc., Brochures of Products, (c) 2007.

* cited by examiner

*Primary Examiner* — Leonard Chang
*Assistant Examiner* — Irving A Campbell
(74) *Attorney, Agent, or Firm* — Wood, Herron & Evans, LLP

(57) ABSTRACT

A liquid storage system. The liquid storage system includes a storage tank having an upright section and a base section. A volume extends between the upright and base section. An inlet and outlet are coupled to the volume for adding and extracting fluid from the storage tank, respectively. There is at least one shelf coupled to the upright section of the storage tank.

20 Claims, 7 Drawing Sheets

LIQUID STORAGE SYSTEM

CROSS-REFERENCE TO RELATED APPLICATION

This application claims the priority of U.S. Provisional Application Ser. No. 61/296,713, filed on Jan. 20, 2010 (pending), the disclosure of which is incorporated by reference herein, in its entirety.

FIELD OF THE INVENTION

The present invention relates generally to liquid storage systems and, more particularly, to used cooking oil and used grease storage systems.

BACKGROUND

Restaurants, food processing facilities, and the like generate used cooking oil or other used liquids during their normal operations. Typically, this used oil is stored in either indoor or outdoor storage tanks. Periodically, a used oil reclamation service will come to the restaurant or food processing facility and transfer the used oil from the storage tank to a tank mounted on a truck, for example, for removing and disposing the used oil.

To reduce the number of times the reclamation service must return to the restaurant or food processing facility, the storage tank is generally large enough to hold several hundred gallons of used oil. Known and conventionally-used storage tanks, such as 55-gallon steel drums, are often bulky in size and difficult to maneuver. Because each steel drum is limited in its volumetric capacity, restaurants or food processing facilities often require two or more steel drums to achieve sufficient storage capacity; however, multiple steel drums or other storage tank systems consume a lot of valuable floor space that could otherwise be used for storing food and other items.

Furthermore, unused grease and cooking oil for use in these facilities are often stored away from the used liquids increasing the floor space consumed.

SUMMARY OF THE INVENTION

The present invention overcomes the foregoing and other shortcomings and drawbacks of known conventional systems for storing and disposing of used cooking oil. While the invention will be described in connection with certain embodiments, it will be understood that the invention is not limited to these embodiments. On the contrary, the invention includes all alternatives, modifications, and equivalents as may be included within the spirit and scope of the present invention.

According to one illustrative embodiment, the invention is directed to a liquid storage system. The liquid storage system includes a storage tank having an upright section and a base section. A volume extends between the upright and base section. An inlet and an outlet are coupled to the volume for adding and extracting a liquid from the storage tank, respectively. There is at least one shelf coupled to the upright section of the storage tank.

In another illustrative embodiment, the invention is directed to an oil storage system. The oil storage system includes a storage tank having an upright section and a base section. A volume extends between the upright and base section. An inlet and an outlet are coupled to the volume for adding and extracting oil from the storage tank, respectively. A tank heater within the volume of the storage tank selectively heats the oil within the storage tank to a predetermined temperature. There is at least one shelf coupled to the upright section of the storage tank.

According to yet another embodiment, the invention is directed to a liquid storage system that includes a base section and an upright section. The base section has a first dimension and a first height; the upright section has a second dimension and a second height. A volume for holding liquid is common to the base and upright sections. There is an inlet and an outlet coupled to the volume, for adding and extracting liquid, respectively. A surface, common to both the base and upright sections, lies substantially within a vertical plane. The first dimension of the base section extends from the surface and is greater than the second dimension of the upright section extending from the surface. The ratio of the first height to the second height ranges from about 4:1 to about 8:1.

The above and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
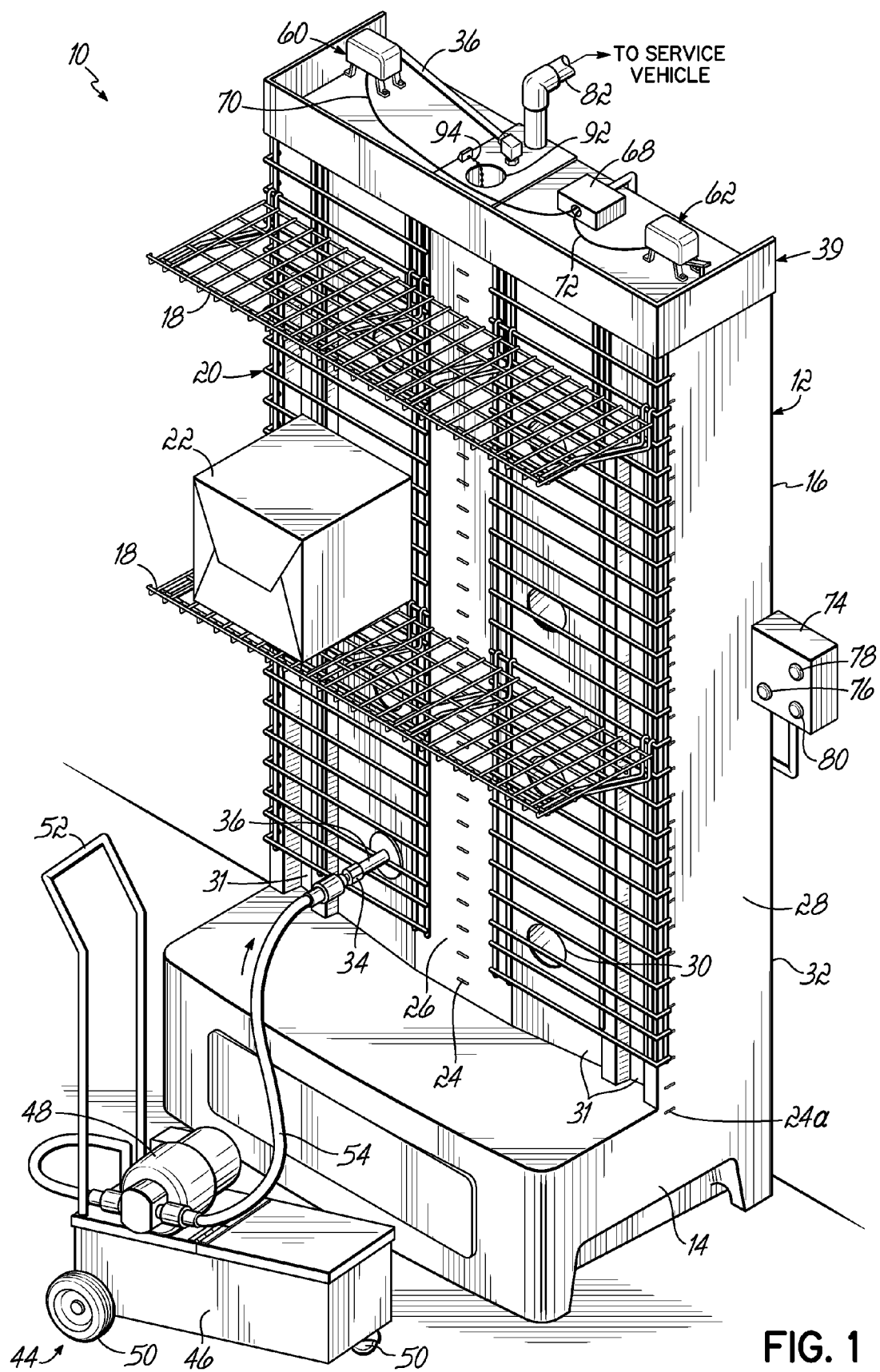
FIG. 1 is a perspective view of a storage system with a plurality of shelves and a mobile storage tank in accordance with one embodiment of the invention.

The liquid storage system described below and shown in the drawings has a smaller footprint than traditional storage tanks, thereby consuming less floor space than conventional storage tanks. In addition, the liquid storage system includes one or more shelves that can hold items such as food and, in particular, boxes of new oil to replace the used oil removed from a restaurant's fryer and other cookware and appliances.

Figure 2:
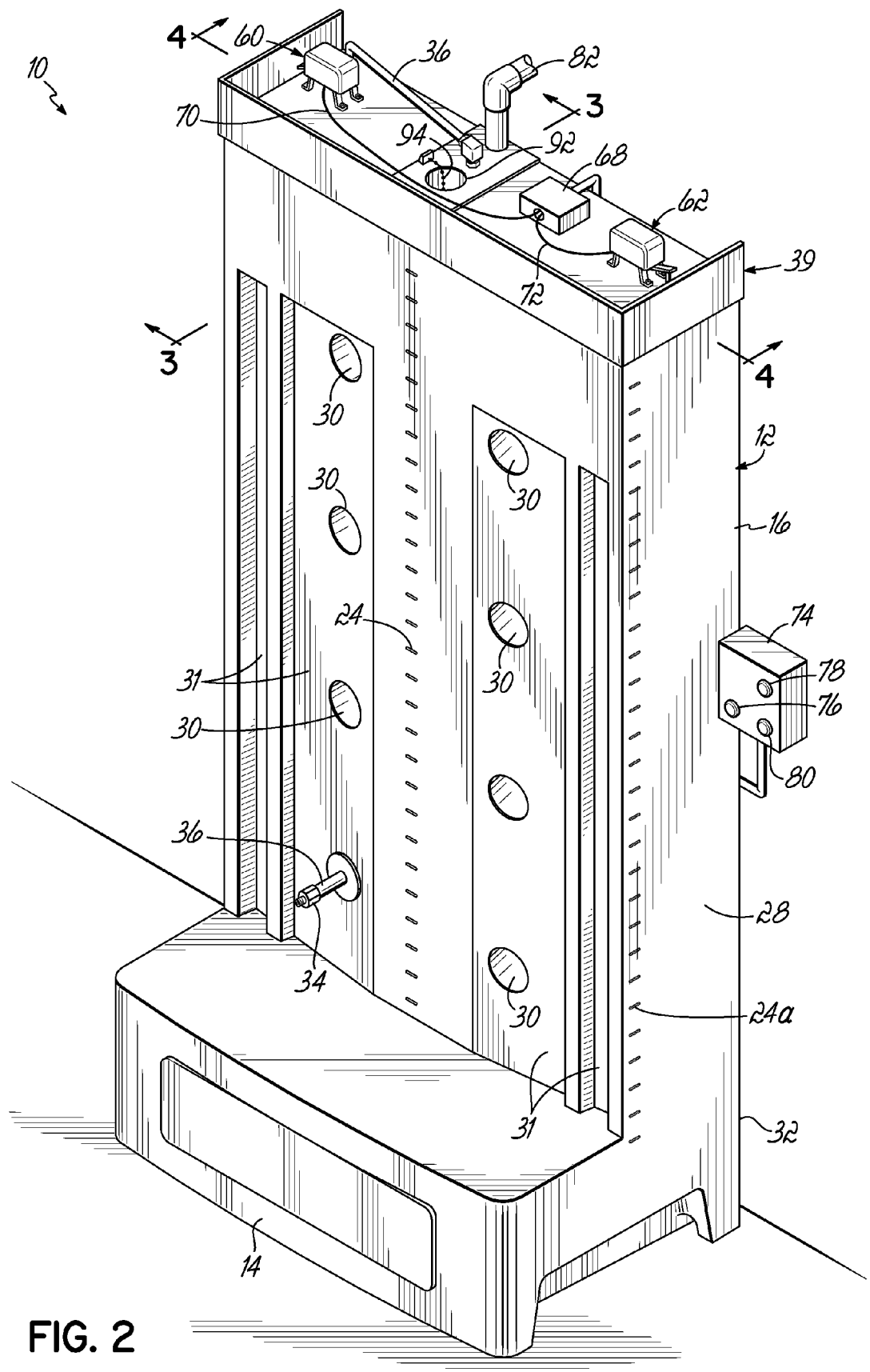
FIG. 2 is another perspective view of the storage system of FIG. 1 without the plurality of shelves and the mobile storage tank.

Referring to FIGS. 1 and 2, the storage system 10 includes a storage tank 12 which has a base section 14 and an upright section 16. A plurality of wire shelves 18 are removably attached to the upright section 16 via a pair of vertical hangers 20 (FIG. 2) and is configured to provide storage space for various items or supplies 22. For example, these supplies 22 may include boxes or containers of clean, unused oil, other consumable items used within the facility, replacement components for deep fryers or like devices, and/or replacement components for the storage system 10. The wire shelves 18 can be removed and repositioned to accommodate items 22 of different sizes. Optionally, additional shelves 18 may be added to the upright section 16. Further details of the plurality of shelves 18 are provided below.

The storage tank 12 in the figures is made from a polyethylene, for example a high density hexane copolymer that is NSF 61 rated, a polypropylene, or other similar material that is at least partially transparent or translucent so that the liquid level in the tank 12 can be readily observed external to the tank 12. Furthermore, a graduated scale 24, for example, one or more marked indicia or dimples, may be located on a front-facing portion 26 of the storage tank 12 so that the liquid level in the tank can be readily determined. A graduated scale 24a may additionally or alternatively be positioned on one or both side portions 28 of the storage tank 12 as shown in FIGS. 1 and 2.

Figure 3:
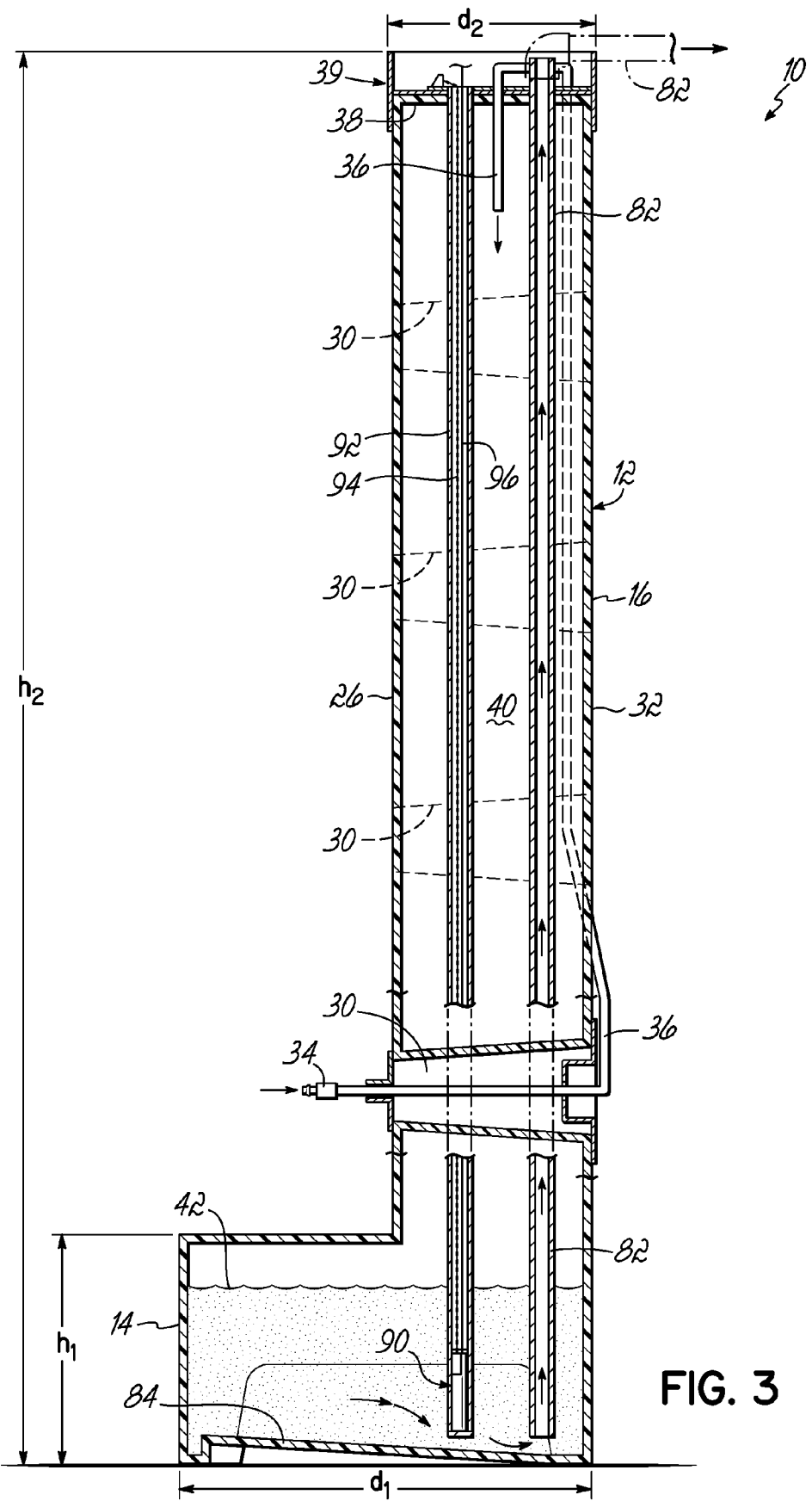
FIG. 3 is a cross-sectional view of the storage system taken along line 3-3 in FIG. 2.

The upright section 16 of the storage tank 12 may include one or more passageways, for example molded holes 30, that extend between the front-facing portion 26 and a rear portion 32 (FIG. 3). The one or more molded holes 30 may permit passage of liquid conduits, as described below; reduce structural flexibility by increasing the rigidity of the storage tank 12, resisting a tendency of the walls of the storage tank 12 to bulge with a high liquid volume, and reducing the overall weight of the storage system 10. It would be readily appreciated that while eight molded holes 30 are shown in the illustrative embodiments herein, this number is not limiting. Other internal structural bracing may be used to increase the rigidity of the storage tank 12 and may supplement or replace altogether the molded holes 30.

The upright section 16 may also include one or more recesses 31, with or without the molded holes 30, to further provide structural strength to the storage tank 12. While each of the particular recesses 31 shown in FIG. 2 extends nearly the full length of the upright section 16, other shapes and lengths of recesses may be used.

While the base and upright sections 14, 16 may be configured to any number of shapes and sizes, constructing the base section 14 to have a larger cross-sectional area, or footprint, than the upright section 16 may provide structural stability. Yet further structural stability may be provided by molding the base section 14 to have thicker walls than the walls comprising the upright section 16. In one exemplary embodiment, the base section 14 may be configured to contain about 100 gallons (378.5 L) of used oil 42 (FIG. 3), e.g., the approximate amount of used oil contained within the two conventional steel drum storage tanks. The dimensions of the upright section 16 may then be selected to achieve a desired additional used oil storage capacity. In this and other embodiments, the dimensions of the upright section 16 may be selected such to provide a desired ratio of the cross-sectional area of the base section 14 to the cross-sectional area of the upright section 16 while providing an overall used oil storage capacity. For instance, a storage tank could be constructed to a have an area ratio of 2:1 with a storage capacity of about 150 gallons (567.8 L). Alternatively, the ratio of the total height of the storage tank 12 ($h_2$) to the height of the base section 14 ($h_1$) may be selected to achieve a ratio of between about 4:1 and about 8:1, and advantageously between about 5:1 and about 6:1. For example, if $h_1$ was 15 inches and $h_2$ was 78 inches, then the ratio is 5.2:1. If the storage tank 12 was 90 inches tall, then the ratio would be 6.0:1. Furthermore, other physical constraints may dictate the dimensions of the storage tank 12, such as the ceiling height of the particular restaurant or food processing facility. For example, a storage tank 12 having an overall height of 7.5 ft (2.3 m) may be configured to store 200 gallons (757.1 L) while a tank having an overall height of 6.5 ft (2.0 m) may be configured to store 175 gallons (662.4 L).

In some embodiments, the storage tank 12 may optionally, though not necessarily, include a surface common to both the base and upright sections 14, 16 that lies in a substantially vertical plane. The surface is illustrated herein as the rear portion 32 that is coextensive between the base and upright sections 14, 16. These embodiments would be particularly useful when positioning the storage tank 12 along a wall so as to minimize wasted space typically associated with placing a cylindrical, conical, or like shaped objects along a planar surface. In that regard, the base section 14 would extend by a first dimension ($d_1$) away from the surface and the upright section 16 would extend by a second dimension ($d_2$) away from the surface. It would be readily understood by those of ordinary skill in the art that $d_1$ or $d_2$ or both may be a length, a depth, a radius, a focal distance, or any other appropriate measure for the particular shape incorporated by the storage tank design. However, it would be further understood that neither $d_1$ nor $d_2$ would exceed the width of the surface; otherwise, wasted space may again occur. Generally, $d_1$ will exceed, or be greater than, $d_2$ so as to recess, or offset, the upright section 16 with respect to a front or forward edge of the base section 14. In these embodiments, the shelves 18 (FIG. 1) may extend from the upright section 16, over the base section 14, and substantially within the recess without increasing, or only minimally increasing, the footprint of the storage tank 12.

To facilitate the processing of filling the storage tank 12 with used oil 42 (FIG. 3), the storage tank 12 includes a quick disconnect inlet fitting 34, which is connected to a conduit 36 (for example, a tube) that extends through one of the molded holes 30 of the storage tank 12. As shown in FIG. 3, the conduit 36 exits the molded hole 30 at the rear portion 32 of the storage tank 12 and continues to a top portion 38 of the storage tank 12. The conduit 36 enters an interior space, or volume 40, contained within the storage tank 12 via an opening in the top portion 38 (FIG. 3) and extends at least partially into the volume 40.

The top portion 38 (FIG. 3) may further include a cap 39 that is configured to reside on the top portion 38 and to support one or more electronics, sensors, or liquid conduits, such as the conduit 36, as described in detail below. The cap 39 may be constructed from metallic or polymeric materials as appropriate or desired.

When the used oil 42 (FIG. 3) in a fryer needs to be changed, the used oil 42 (FIG. 3) is extracted from the fryer (not shown) and placed into a mobile storage tank, commonly referred to as a caddie 44 (FIG. 1). The particular illustrated caddie 44 includes a tank 46 and a pump 48 that is made portable via wheels 50 and a handlebar 52. A conduit 54 (i.e., tubing or hose) extends from the pump 48, which may be operated in both a fill and an empty mode. Accordingly, when the fryer needs to be emptied and cleaned, the caddie 44 is transported to the fryer and the conduit 54 is attached thereto. The pump 48 is operated in the fill mode such that the used oil 42 (FIG. 3) moves from the fryer to the tank 46. The caddie 44 is then moved to the storage system 10 and the conduit 54 coupled to the inlet fitting 34. The pump 48 on the caddie 44 is then turned on and operated in the empty mode such that the used oil 42 (FIG. 3) is pumped through the conduit 54 of the caddie 44 and into the conduit 36 of the storage tank 12. When the caddie 44 is empty, the pump 48 is turned off and the conduit 54 is disconnected from the fitting 34.

Alternatively, though not specifically shown, the used oil 42 (FIG. 3) may be directly transferred from the fryer to the storage tank 12. For example, a pump (not shown) may be included on the fryer and having a conduit that extends from the fryer to the inlet fitting 34. Operation of the pump transfers the used oil 42 (FIG. 3) directly from the fryer to the storage tank 12.

Figure 4:
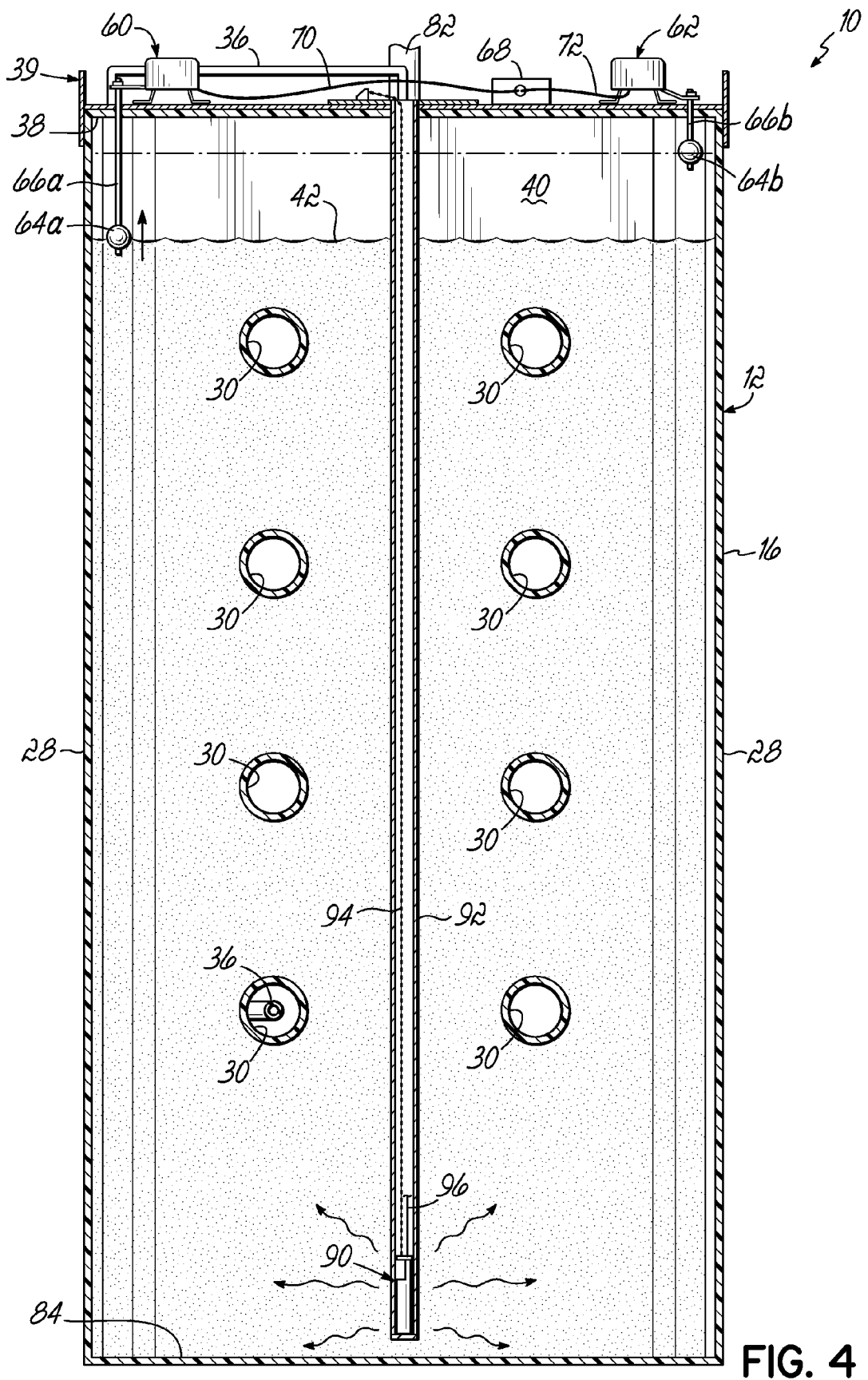
FIG. 4 is a cross-sectional view of the storage system taken along line 4-4 in FIG. 2.

FIGS. 2 and 4 illustrate two liquid level switches 60, 62 that extend from the top portion 38 into the volume 40 of the tank 12. The liquid level switches 60, 62 may include any number of configurations that are known to those of ordinary skill in the art, including, for example, floats, ultrasonic, resistive, optical, and so forth. The particular illustrative switch 60, 62 is a float level switch that includes a float 64a, 64b coupled to a rod 66a, 66b, where the rod 66a of the first switch 60 is longer than the rod 66b of the second switch 62 such that the first switch 60 is activated at a lower liquid level as compared to the second switch 62.

Each switch 60, 62 is electrically connected to an electric junction box 68 via wires 70, 72. A control panel 74 is also electrically coupled to the junction box 68 and includes three lights 76, 78, 80. A first light 78, which may be green or any other desired color, is illuminated during normal operation; however, when the used oil level reaches the first float 64a of the first switch 60 (shown in solid in FIG. 4), the first switch 60 is activated and the light 76, which may be yellow or any other color, on a control panel 74 illuminates to indicate that the used oil 42 (FIG. 3) has reached a first predetermined level. At this first predetermined level, the illuminated light 78 will serve as an indicator that the tank 12, although not completely full, should be emptied or an order placed with the reclamation service. When the used oil level reaches the second float 64b of the second switch 62 (shown in phantom in FIG. 4), the second switch 62 is activated and the light 80, which may be red or any other desired color, on a control panel 74 illuminates to indicate that the used oil 42 (FIG. 3) has reached a second predetermined level. At this second level, the illuminated light 80 will serve as an indicator that the tank 12 is full and emptying is required. If desired, an alarm may also sound to warn the users that the tank 12 is full and that no more used oil 42 (FIG. 3) should be pumped into the storage tank 12.

Typically, the used oil 42 (FIG. 3) will be removed from the storage tank 12 when the oil level is between the first predetermined level and the second predetermined level. To facilitate removing the used oil 42 (FIG. 3), the storage tank 12 includes an outlet conduit 82, which is shown in FIG. 3. The outlet conduit 82 extends into the volume 40 to almost a bottom 84 of the storage tank 12 so as to drain nearly the full volume of used oil 42 from the tank 12. In some embodiments and as shown, the bottom 84 may be sloped such that the outlet conduit 82 extends toward a lowered end of the bottom 84 to further facilitate draining; however, the sloped bottom is not required. While the outlet conduit 82 may exit the tank 12 at any location, the illustrative embodiment shows the outlet conduit 82 extending up to the top portion 38 where a fluid-tight seal around the outlet conduit 82 is not required. The outlet conduit 82 may be connected to one or more additional pipes, with or without valves and fittings, that are configured to couple the volume 40 of the tank 12 to a service vehicle (not shown) or other mobile storage unit. The service vehicle will include a pump or vacuum (not shown) operable to pump the used oil 42 (FIG. 3) out of the storage tank 12 and into a tank of the service vehicle or mobile storage unit. In some embodiments, the service vehicle or mobile storage unit may be parked outside the building housing the storage system 10. Accordingly, the outlet conduit 82 and/or the additional pipes may extend to an outside fitting (not shown).

While not specifically shown, the control panel 74 may include a button to reset the switches 60, 62 and/or lights 76 and 80 after the tank 12 has been emptied.

Figure 4A:
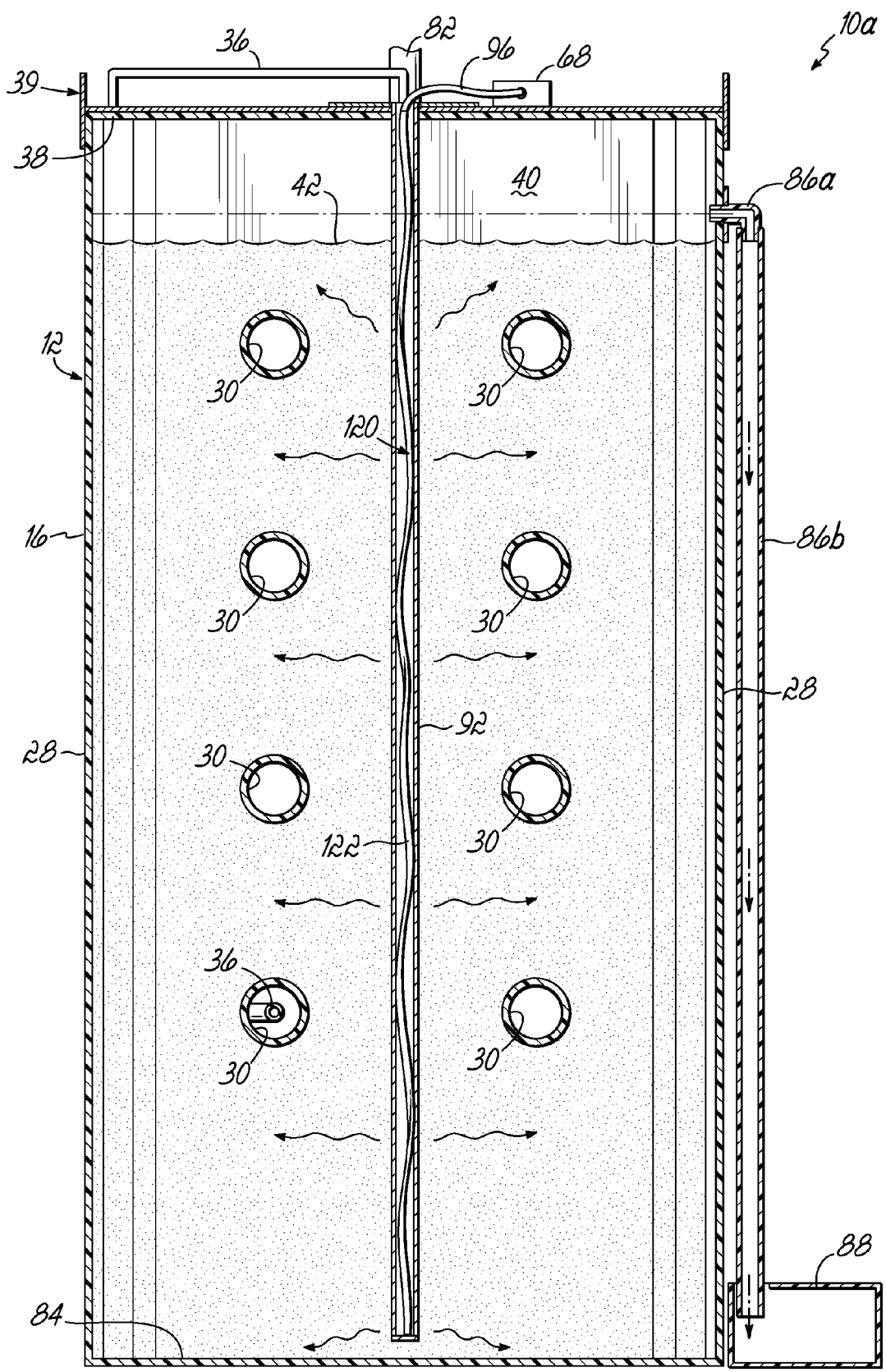
FIG. 4A is a cross-sectional view of another embodiment of a storage system.

Alternatively, and as shown in FIG. 4A, a storage system 10a having been constructed from a sufficiently transparent or translucent material, does not require one or more liquid level switches 60, 62 (FIG. 4) because the liquid level is readily and visually determinable. In such embodiments, one or more indicia (not shown) may be positioned on an outer surface of the upright section 16 to indicate first and second predetermined levels. Moreover, the upright section 16 may include an overflow tube 86a, with or without an extension 86b that leads to a used oil container 88, fluidically coupled to the volume 40 at the second predetermined level. In this way and if the storage system 10a is not emptied prior to the addition of further used oil 42, then any volume of used oil 42 meeting or exceeding the second predetermined level automatically flows through the overflow tube 86a to the used oil container 88.

Figure 5A:
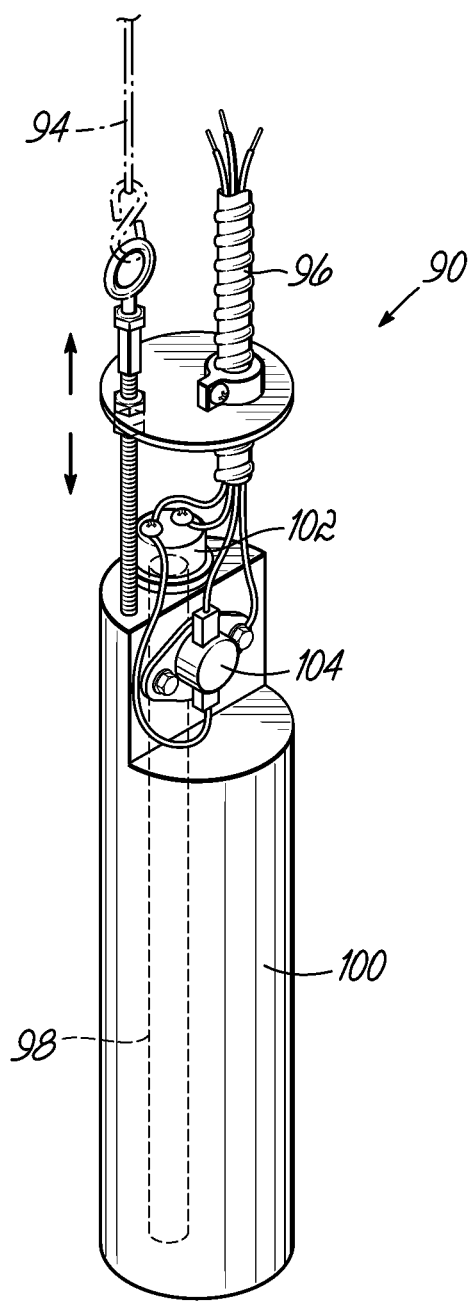
FIG. 5A is a perspective view of one embodiment of a heater, shown in partial cross-section, suitable for use with an embodiment of the invention.

Under ambient conditions, some oils and grease may partially polymerize or otherwise partially solidify making the transfer of used oil 42 more difficult. In order to keep the used oil 42 in the tank 12 in a free-flowing state (for example, a liquid state) so it can be pumped out, the storage tank 12 may be heated by a tank heater 90 to a predetermined temperature (for example, a melting point), shown in detail in FIGS. 4 and 5A. A sealed sleeve 92 extends from the top portion 38 into the volume 40 of the tank 12 and is sized to receive the tank heater 90 so that the used oil 42 does not directly contact the tank heater 90. A chain, rope, or other similar structure extends between the tank heater 90 and the top portion 38 for safely lowering the tank heater 90 into the sleeve 92. The tank heater 90 is electrically connected to a junction box 68 via an electrical conduit 96.

The tank heater 90 includes a heating element 98 surrounded by a housing 100. Ideally, though not necessarily, the outer diameter of the housing 100 is approximately the inner diameter of the sleeve 92 to efficiently transfer heat energy between the tank heater 90 and the used oil 42 of the tank 12. A terminal end 102 of the heating element 98 is coupled to a thermostat 104 for operating the heating element 98. When the thermostat activates the heating element 98, a light (not shown) located on the control panel 74 may illuminate to indicate proper function.

Figure 5B:
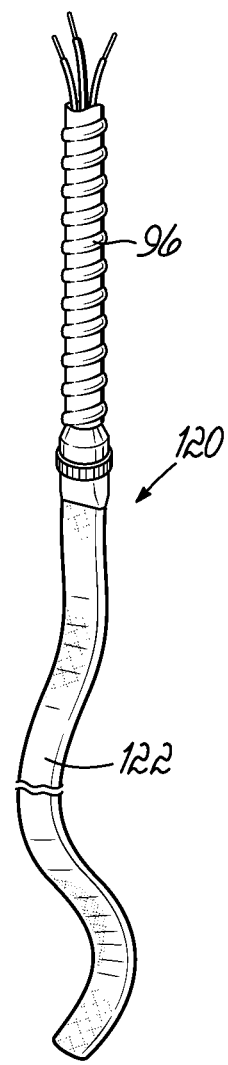
FIG. 5B is a perspective view of another embodiment of a heater suitable for use with an embodiment of the invention.

FIGS. 4A and 5B illustrate another embodiment of a heater 120 that is suitable for use with an embodiment of the invention. The heater 120 includes a ribbon element 122 that is configured to extend nearly the full length of the sleeve 92. In this way, heat may be more efficiently transferred to a larger area and the used oil 42 retained in the free-flowing state while consuming less energy. While the particular embodiment of the heater 120 is illustrated as a ribbon, it would be readily appreciated that other heater styles may be used, for example, a rope heater.

Figure 6:
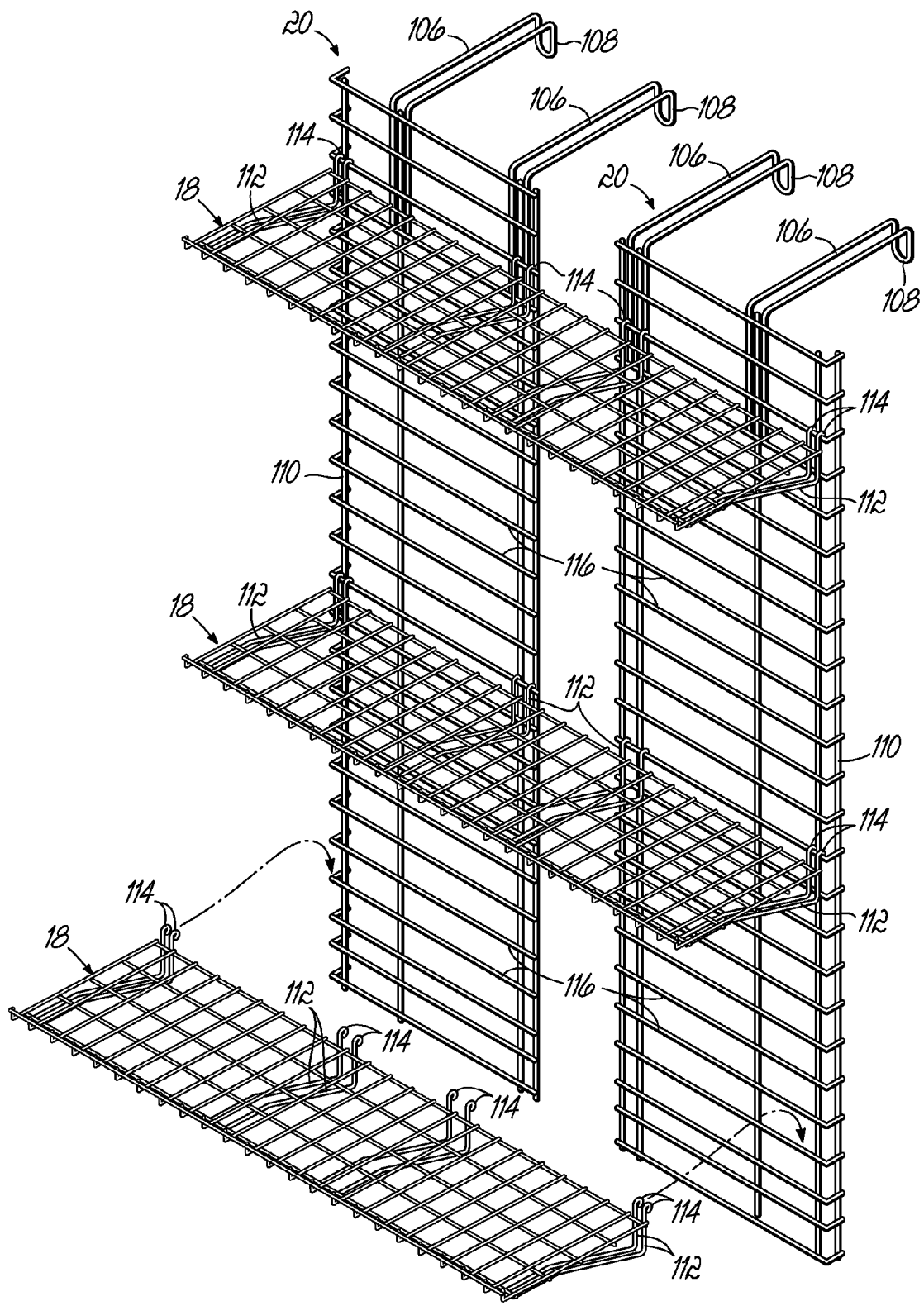
FIG. 6 is a perspective view of the plurality of shelves of the storage system shown in FIG. 1.

Turning now to FIG. 6, the details of the plurality of shelves 18 and vertical hangers 20 are shown and described. While the illustrative plurality of shelves 18 and the vertical hangers 20 are constructed from metallic or rigid polymeric wires, it would be readily understood that other construction materials may be used, such as meshes or solid constructions.

As is shown, two separate vertical hangers 20 are used in parallel to support shelves 18 that extend the full width of the upright section 16 (FIG. 1). In other embodiments, it is possible that a single or two or more vertical hangers could be used to support the full-width shelf 18 or shelves extending only a portion of the width (not shown). In any event, each vertical hanger 20 includes a hanging arm (two hanging arms 106 are shown per vertical hanger 20). The length of each hanging arm 106 is approximately the depth of the upright section 16 (FIG. 1) so that the hanging arm 106 may extend across the top of the upright section 16 (FIG. 1) between the top portion 38 (FIG. 3) and the cap 39 (FIG. 1). A downwardly-directed finger 108 of each hanging arm 106 folds down over the rear portion 32 (FIG. 3) of the tank 12 (FIG. 1) to further secure each vertical hanger 20. Additionally, each vertical hanger 20 may include a side-arm 110, as appropriate, to extend around the front-facing portion 26 (FIG. 1) to the side portion 28 (FIG. 1) of the tank 12 (FIG. 1). This provides still further stability to the vertical hangers 20.

Each shelf 18 includes an "L"-shaped support 112 that terminates in a hook 114. The hooks are shaped to receive a cross-member 116 of the vertical hanger 20 and to rotate about the cross-member 116 until the shelf 18 comes to a resting position adjacent the vertical hanger 20. Accordingly, one or more shelves 18 may be provided without disrupting the fluid-tight integrity of the tank 12 (FIG. 1).

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

What is claimed is:

1. A liquid storage system comprising:
a storage tank having an upright section and a base section and a volume extending contiguously therebetween, the volume configured to hold liquid therein, and the volume having no valve between the upright section and the base section such that liquid could flow freely and unobstructed between the upright section and the base section;
an inlet fluidically coupled to the volume for adding liquid to the storage tank;
an outlet fluidically coupled to the volume for extracting liquid from the storage tank; and
at least one shelf removably coupled to the upright section, wherein the upright section and the base section have at least one common side surface that is constructed primarily of a material that is translucent or transparent so that liquid within the storage tank is externally visible.

2. The liquid storage system of claim 1 further comprising:
a tank heater disposed within the volume for selectively heating liquid within the storage tank.

3. The liquid storage system of claim 2, wherein the tank heater further is coupled to a thermostat for maintaining liquid within the storage tank at a predetermined temperature.

4. The liquid storage system of claim 1 further comprising:
a first liquid level switch configured to transmit a signal indicative of a first liquid level within the volume of the storage tank.

5. The liquid storage system of claim 4 further comprising:
a second liquid level switch configured to transmit a signal indicative of a second liquid level within the volume of the storage tank.

6. The liquid storage system of claim 4 further comprising:
a control panel configured to receive the signal and to transmit a visual signal, an audible signal, or both indicative of the first liquid level.

7. The liquid storage system of claim 1, wherein the at least one shelf further comprises:
a vertical hanger coupled to the upright section and configured to support the at least one shelf.

8. The liquid storage system of claim 1, wherein the upright section is recessed from a front edge of the base section and the at least one shelf is configured to store at least one item within the recess.

9. The liquid storage system of claim 1, wherein the upright section includes at least one passageway integrally formed into and extending between two opposing sides of the upright section to increase structural rigidity of the upright section.

10. The liquid storage system of claim 9, further comprising:
a conduit being positioned within and extending through the at least one passageway.

11. The liquid storage system of claim 1, wherein the base and upright sections have a common surface that extends substantially within a vertical plane, the base section having a first dimension extending from the common surface and the upright section having a second dimension extending from the common surface, the first dimension being greater than the second dimension.

12. The liquid storage system of claim 1, wherein the base section holds a volume of liquid at least equal to a volume held by the upright section.

13. An oil storage system comprising:
a storage tank having an upright section and a base section and a volume extending contiguously therebetween, the volume configured to contain oil therein, and the volume having no valve between the upright section and the base section such that oil could flow freely and unobstructed between the upright section and the base section;
an inlet fluidically coupled to the volume for adding oil to the storage tank;
an outlet fluidically coupled to the volume for extracting oil from the storage tank;
a tank heater within the volume for selectively heating the oil within the storage tank to a predetermined temperature; and
at least one shelf coupled to the upright section,
wherein the upright section is recessed from a front edge of the base section and the at least one shelf is configured to store at least one item within the recess.

14. The oil storage system of claim 13 further comprising:
a first level switch configured to transmit a first signal indicative of a first oil level within the volume of the storage tank; and
a second level switch configured to transmit a second signal indicative of a second oil level within the volume of the storage tank.

15. The oil storage system of claim 14 further comprising:
a control panel configured to receive the first and second signals and to transmit a visual signal, an audible signal, or both indicative of the first and second oil levels, respectively.

16. The oil storage system of claim 13, wherein the at least one shelf further comprises:
a vertical hanger coupled to the upright section and configured to support the at least one shelf.

17. The oil storage system of claim 13, wherein the storage tank is constructed primarily of a material that is translucent or transparent so that liquid within the tank is externally visible, the upright section having at least one indicia on an exterior surface thereof to identify a liquid level.

18. The oil storage system of claim 13, wherein the base and upright sections have a common surface that extends substantially within a vertical plane, the base section having a first dimension extending from the common surface and the upright section having a second dimension extending from the common surface, the first dimension being greater than the second dimension.

19. A liquid storage system comprising:
- a base section having a first dimension and a first height;
- an upright section having a second dimension and a second height;
- a volume extending contiguously between the base and upright sections for holding liquid therein, there being no valve between the upright section and the base section such that liquid could flow freely and unobstructed between the upright section and the base section;
- an inlet fluidically coupled to the volume for adding liquid to the volume;
- an outlet fluidically coupled to the volume for extracting liquid from the volume; and
- a back surface common to the base and upright sections and lying substantially within a vertical plane,
- wherein the first dimension extends from the back surface and is greater than the second dimension extending from the surface and a ratio of the first height to the second height ranges from about 4:1 to about 8:1,
- wherein the upright section and the base section have at least one common side surface that is constructed primarily of a material that is translucent or transparent so that liquid within the storage system is externally visible.

20. The liquid storage system of claim 19 further comprising:
- one or more shelves removably coupled to the upright section and having a length that is the first dimension less the second dimension.

* * * * *